United States Patent [19]

Gradl et al.

[11] Patent Number: 4,540,558

[45] Date of Patent: Sep. 10, 1985

[54] PROCESS FOR REMOVING ORGANIC CONTAMINANTS FROM WET-PROCESSED PHOSPHORIC ACID

[75] Inventors: Reinhard Gradl, Hürth; Hans-Werner Stephan, Cologne; Gero Heymer; Günther Schimmel, both of Erftstadt, all of Fed. Rep. of Germany

[73] Assignee: Hoechst Aktiengesellschaft, Fed. Rep. of Germany

[21] Appl. No.: 627,456

[22] Filed: Jul. 3, 1984

[30] Foreign Application Priority Data

Jul. 18, 1983 [DE] Fed. Rep. of Germany ....... 3325862

[51] Int. Cl.$^3$ ............................................. C01B 23/16
[52] U.S. Cl. .............................. 423/321 R; 423/321 S
[58] Field of Search ................ 423/321 R, 321 S, 316, 423/317

[56] References Cited

U.S. PATENT DOCUMENTS

| 4,134,964 | 1/1979 | Ehlers et al. | |
| 4,215,098 | 7/1980 | Lowe | 423/321 R |
| 4,330,516 | 5/1982 | Winand | 423/321 R |

FOREIGN PATENT DOCUMENTS 2065381 5/1973 Fed. Rep. of Germany .
2522220 12/1976 Fed. Rep. of Germany .

*Primary Examiner*—Gregory A. Heller
*Attorney, Agent, or Firm*—Connolly and Hutz

[57] ABSTRACT

The disclosure relates to a process for removing organic compounds from wet-processed phosphoric acid with the aid of an adsorbant. To this end the disclosure provides for the acid to be heated to at least 250° C. prior to treating it with the adsorbant. The disclosure also relates to an apparatus for carrying out the process.

4 Claims, 1 Drawing Figure

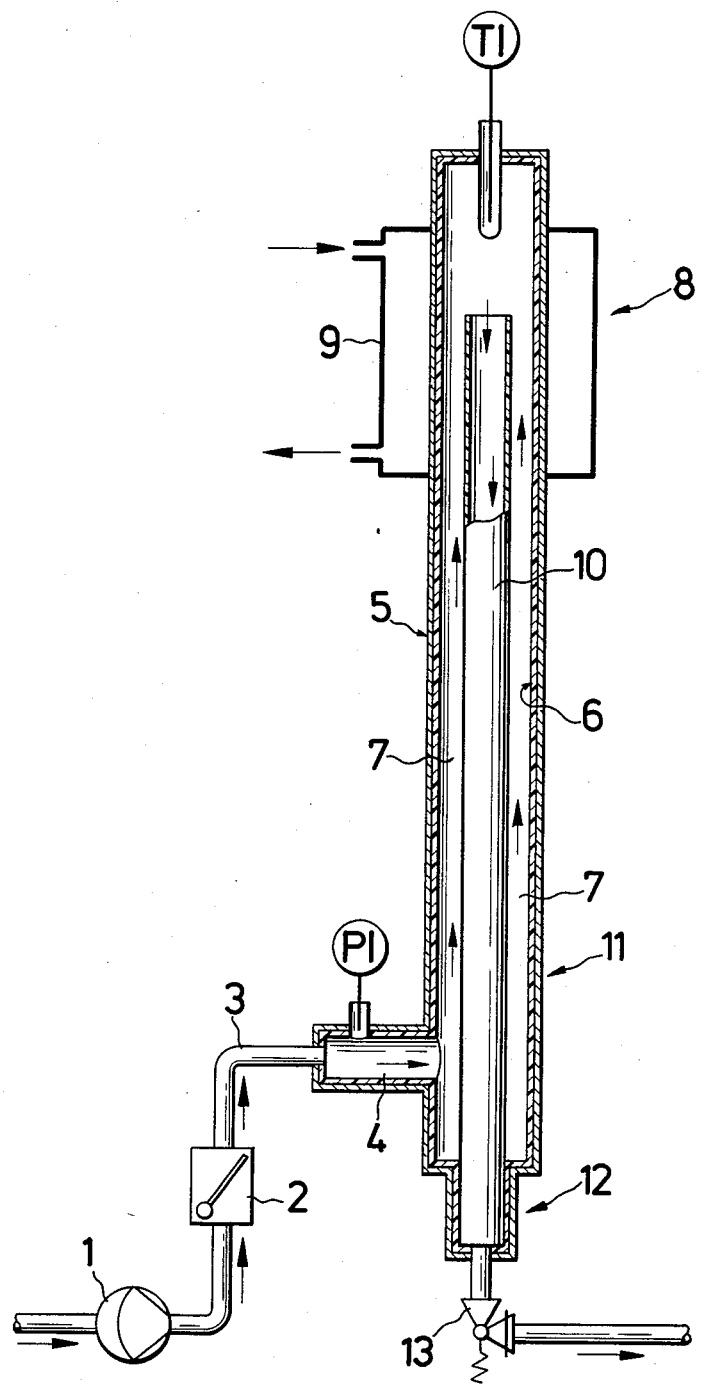

PROCESS FOR REMOVING ORGANIC CONTAMINANTS FROM WET-PROCESSED PHOSPHORIC ACID

The present invention relates to a process and apparatus for removing organic compounds from wet-processed phosphoric acids, especially from those which contain 25-55 weight % $P_2O_5$, with the use of an adsorbant.

Heavily contaminated crude phosphoric acid is obtained on processing phosphate ore with a mineral acid, the acid containing up to 5% sulfate as a principal contaminant in the event of the phosphate ore having been processed with sulfuric acid. Apart from inorganic contaminants, the crude acid also contains organic compounds which originate from the feed material (crude phosphate) or are added thereto later during a pretreatment stage or the processing stage.

These contaminants have to be removed for work-up of the crude acid into purified acid which finds widespread uses.

The removal of organic substances from phosphoric acid with the use of active carbon as an adsorbant has already been described. German Specification DE-AS No. 24 47 390, for example, discloses a process for purifying crude wet-processed phosphoric acid containing free sulfuric acid at elevated temperature, wherein a calcium compound, an alkali metal compound, silicic acid compound and sulfate compound and also an adsorbant for the organic contaminants are added to the crude acid, and the solid matter added or formed is separated, the calcium compound being used in a quantity necessary for the precipitation of sulfuric acid as calcium sulfate. In this process, active carbon is the adsorbant exclusively used for removing the organic contaminants. Considerable quantities of high-grade and hence expensive active carbon are, however, required to be used whenever a crude acid relatively heavily contaminated with organic compounds ($C_{org.}$) is to be purified.

In addition to this, the art is aware of crude acids whose content of $C_{org.}$ contaminants cannot, even with an excess of high-grade active carbon or other adsorbant, be reduced to the extent necessary to permit work up. The reason for this does not exclusively reside in the absolute level of organic contaminants, it resides basically in the particular nature of at least some of these compounds. It is just these acids which are used as commercially interesting feed materials, are normally available in large quantities and commonly less expensive than other materials.

Various attempts have therefore been made to destroy the organic contaminants by the addition of one or more addends, especially owidants, e.g. alkali metal chlorate (cf. German Specification DE-PS No. 25 22 220) or to extract them, prior to actually purifying the phosphoric acid, by means of an organic solvent, immiscible with water, e.g. Diesel oil (cf. German Specification DE-OS No. 20 65 381). In the two cases just described the $C_{org.}$ contaminants are but insufficiently removed; in the first case, undesirable foreign ions (e.g. chloride) are additionally introduced into the acid, and in the second case, the process is too expensive to be commercially attractive.

It is therefore highly desirable to have a process and apparatus for purifying wet-processed phosphoric acid which provide for the $C_{org.}$ compounds present in the crude acid to be extensively destroyed or to be so altered that they can be removed by standard purification methods, without the need to add chemicals.

To this end, the present invention unexpectedly provides for a commercially available crude phosphoric acid to be heated in a closed apparatus to a temperature of at least 250° C., preferably at least 300° C., under a pressure of 15-85 bars, preferably 30-85 bars, prior to treating the acid with the adsorbant. It is good practice for the acid to be heated over as long a period as necessary for destroying or converting the particular contaminants, for it to be allowed to cool to 60°-100° C. and to be then treated with the adsorbant in customary manner.

The present process enables use to be made of commercially available phosphoric acids containing from 25-55 weight % $P_2O_5$, preferably concentrated acids containing from 45-55 weight % $P_2O_5$, with high $C_{org.}$-contents. More particularly, crude phosphoric acid is heated inside a closed pressure-resistant apparatus, maintained at a desirable final temperature, and cooled to a temperature desired in the operational steps to follow. The steps of heating and cooling should preferably be effected by indirect heat transfer; it is energetically good practice to heat the cold acid admitted to the apparatus with hot effluent acid flowing countercurrently thereto.

The organic contaminants commence decomposition from 120° C. upward. The decomposition incrases distinctly with an incrasing temperature. It is therefore preferable to operate at a temperature of at least 250° C., preferably at least 300° C. The upper temperature limit is set by the resistance to corrosion and pressure of the materials used for making the apparatus.

The pressure which establishes on heating the crude acid corresponds to the vapor pressure of phosphoric acid and depends on the temperature, concentration of the acid and contaminants contained therein. Once the desirable final temperature has been reached, it is advantageous to maintain the acid at that temperature for some time. The determining factor for the destruction of the organic contaminants is the final temperature; the sojourn time of the acid in the apparatus is considerably less critical and should be 0.1-0.5 hour.

It is also advantageous to cool the acid indirectly preferably by means of untreated crude acid admitted to the apparatus. The heat exchanger surfaces should be given the dimensions necessary to ensure that the acid put through is cooled to a temperature desirable for direct work up.

To separate the organic contaminants, the acid is admixed with an adsorbant in customary manner. It is highly advantageous to add pulverulent or granular active carbon or carbon black with agitation. It is also possible however to combine the addition of the adsorbant with the desulfatization and/or defluorination and/or separation of difficultly soluble sulfides. It is more especially possible to add the adsorbant during a pre-purifying treatment, as described in DE-PS No. 24 47 390.

Even the expert would not have expected the steps of this invention to produce the result described inasmuch as the molecules of the organic contaminants are to a more or less great extent cracked under the action of heat, i.e. disintegrated to smaller fragments, and as it is generally accepted that larger organic molecules are more easily adsorbed than smaller ones.

The present process offers a series of technically beneficial effects which reside in the following facts:

(a) the phosphoric acid concentration remains unchanged (b) no foreign ions are introduced into the acid (c) expensive processing steps, such as filtration or extraction, are omitted (d) the step of heating the acid preparatory to conventional purification is dispensed with (e) the temperature and pressure conditions selected ensure very short sojourn times for the acid in the apparatus so that relatively small pressure-resistant apparatus can be used even at high throughput rates.

The commercial processes for making and purifying phosphoric acid are all carried out continuously. It is therefore also desirable to have an apparatus for carrying out the present process of removing organic contaminants, permitting crude wet-processed phosphoric acid to be continuously heated therein under pressure to a temperature of at least 250° C., preferably at least 300° C.

The present invention now provides such apparatus. It is shown diagrammatically in the accompanying drawing and consists essentially of a closed cylindrical reactor 5 provided in the region of one of its ends with a phosphoric acid feed pipe 4 connected by means of a conduit 3 to a wet-processed phosphoric acid conveying means 1 and, in the region of its opposite end, with a heating means 9 and, in its interior, with a centrally disposed tube 10 smaller in diameter, the tube 10 terminating in an open end and closed end, respectively, the open end lying in the reactor region provided with the heating means 9, and the opposite closed end reaching beyond the phosphoric acid feed pipe and projecting outwardly from the reactor 5, the projecting end being closed by means of a pressure-retaining valve 13 and used as a phosphoric acid outlet.

Further preferred features of the apparatus provide:

(a) for a pressure-retaining means to be disposed between the phosphoric acid feed pipe 4 and crude phosphoric acid conveying means 1;

(b) for a pressure-indicating means TI to be disposed in the phosphoric acid feed pipe 4;

(c) for a temperature-indicating means TI to be disposed in the reactor portion provided with the heating means 9.

As regards resistance to corrosion and pressure, it is necessary for the reactor material to comply with high standards. The reactor should preferably be made up of a metal and its walls contacted by product should be lined with graphite, silver, silicon carbide, preferably polytetrafluoroethylene.

The present apparatus and the manner of operating it will now be described with reference to the accompanying drawing.

Crude acid coming from a conveying means 1 optionally provided with a pressure-retaining means 2 is pumped through conduit 3 and feed pipe 4 into pressure-resistant reactor 5 of which the inside is preferably lined with acidproof material. The crude acid travels in the exterior zone 7 of reactor 5 to heating zone 8, is heated therein by heating means 9 mounted on reactor 5, and then flows into the open end of tube 10 centrally disposed in reactor 5. In tube 10, the heated acid flows countercurrently as shown at 11 to incoming acid, and is removed from the reactor at 12 and through pressure-retaining valve 13. In this way, the incoming cold acid is heated in the exterior zone 7 by hot acid drained off through 11, and the hot acid becomes cooled. The advantage of this arrangement resides in the fact that the wall thickness of tube 10 along its entire length in the interior of reactor 5 can be reduced to a minimum (there is no need for it to be pressure-resistant) favoring the flow of heat. Acid inlet and acid outlet are disposed practically at the same position in the double tube and are relatively cold so that it is not absolutely necessary for the metal to be protected against corrosion at these places.

An electric resistance heating or jacket with a heat-carrying medium can, for example, be used as the heating means 9.

EXAMPLE 1

(Comparative Example)

Commercially available crude phosphoric acid containing about 53% $P_2O_5$ and prepared by reacting about 50% Zin phosphate (Israel) and about 50% Khouribga phosphate (Morocco) with sulfuric acid was used. It contained 0.17% organically bound carbon ($C_{org.}$). Aliquote portions of this acid were in each case heated to 80° C., mixed with agitation with the quantities of active carbon indicated below, and filtered on a pressure filter, after 30 minutes.

| Active carbon quantity, based on $P_2O_5$, in % | 0.2 | 0.5 | 1.0 | 2.0 | 3.0 |
|---|---|---|---|---|---|
| $C_{org.}$ in acid, ppm | 804 | 567 | 490 | 337 | 257 |

EXAMPLE 2

The same acid as that used in Example 1 was heated to 250° C. in a silver-lined 250 ml laboratory autoclave, maintained for 20 minutes at that temperature (a pressure of 40 bars was found to establish) and gradually cooled to 80° C. Aliquote portions were in each case treated with varying proportions of active carbon as described in Example 1, and filtered off after 20 minutes. The residual content of organic contaminants was determined in the filtrates.

| Active carbon quantity, based on $P_2O_5$, in % | 0.2 | 0.5 | 1.0 | 2.0 |
|---|---|---|---|---|
| $C_{org.}$ in acid, ppm | 217 | 172 | 126 | 55 |

EXAMPLE 3

The same acid as that used in Example 1 was heated to 250° C. in a jacket reactor lined with polytetrafluoroethylene, as shown diagrammatically in the accompanying drawing. The flow velocity was so selected that the mean sojourn time of the acid in the reactor was about 6 minutes. After cooling to 80° C., aliquote portions of the acid were treated as described in Example 1 with varying proportions of active carbon, and filtered after 30 minutes. The residual content of organic contaminants in the filtrates was determined.

| Active carbon quantity, based on $P_2O_5$, in % | 0.2 | 0.5 | 1.0 | 2.0 |
|---|---|---|---|---|
| $C_{org.}$ in acid, ppm | 210 | 174 | 153 | 125 |

EXAMPLE 4

(Comparative Example)

Commercially available crude phosphoric acid based on Florida phosphate, containing 52% $P_2O_5$ and 1670 ppm $C_{org.}$ was used. As described in Example 1, the acid was treated at 80° C. with varying quantities of active carbon. The respective $C_{org.}$ contents were determined after filtration.

| Active carbon quantity, based on $P_2O_5$, in % | 0.5 | 1.0 | 2.0 |
|---|---|---|---|
| $C_{org.}$ in acid, ppm | 1130 | 950 | 720 |

EXAMPLE 5

The same acid as that used in Example 4 was heated for about 20 minutes to 300° C. in an autoclave lined with polytetrafluoroethylene. After cooling, aliquote portions of the acid were treated with varying quantities of active carbon. The $C_{org.}$ content was determined after filtration.

| Active carbon quantity, based on $P_2O_5$, in % | 0.5 | 1.0 | 2.0 |
|---|---|---|---|
| $C_{org.}$ in acid, ppm | 150 | 105 | 78 |

We claim:

1. A process for removing organic compounds from crude wet-processed phosphoric acid comprising heating the acid to a temperature of at least 250° C. under a pressure of 15 to 85 bars, prior to contacting it with an adsorbant of active carbon or carbon black.

2. The process as claimed in claim 1, wherein the acid is heated to at least 300° C. under a pressure of 30 to 85 bars.

3. The process as claimed in claim 1, wherein the acid is heated over a period of 0.1 to 0.5 hour.

4. The process as claimed in claim 1, wherein the heated acid is allowed to cool to 60°–100° C., prior to contacting it with the adsorbant.

* * * * *